United States Patent [19]

Schlinke

[11] 4,132,072

[45] Jan. 2, 1979

[54] HYDROSTATIC CONVERTER

[76] Inventor: Günter R. Schlinke, Distelfinkweg 77, 1000 Berlin 47, Fed. Rep. of Germany

[21] Appl. No.: 793,414

[22] Filed: May 3, 1977

[30] Foreign Application Priority Data

Apr. 26, 1977 [DE] Fed. Rep. of Germany ....... 2620692

[51] Int. Cl.² ............................................. F16H 39/46
[52] U.S. Cl. ...................................... 60/443; 60/444; 60/445; 60/487
[58] Field of Search ................ 60/443, 444, 445, 448, 60/449, 451, 452, 487, 488, 494

[56] References Cited

U.S. PATENT DOCUMENTS

| | | | |
|---|---|---|---|
| 2,161,439 | 6/1939 | Thoma | 60/451 |
| 3,003,309 | 10/1961 | Bowers et al. | 60/452 X |
| 3,214,911 | 11/1965 | Kempson | 60/444 X |
| 3,523,419 | 8/1970 | Hindle | 60/448 |

Primary Examiner—Edgar W. Geoghegan
Attorney, Agent, or Firm—Parmelee, Johnson, Bollinger & Bramblett

[57] ABSTRACT

A hydrostatic converter has at least one hydromotor and at least one pump. The characteristic curve of the pump, which represents the relationship between pressure and stroke volume, has a hyperbolic part. The performance graph of the hydromotor, which represents the relationship between motor driving torque and motor speed, also has a hyperbolic part. A torque controller, including a regulating unit, is associated with the pump for producing a variable auxiliary force for displacing the hyperbolic part of the performance graph of the hydromotor. Automatic, stepless adjustment of the rate of revolution and torque takes place at the hydromotor as a function of the load, in both the full and partial load ranges.

19 Claims, 13 Drawing Figures

HYDROSTATIC CONVERTER

The invention relates to a hydrostatic converter, steplessly adjustable by a regulating unit and having at least one hydromotor and at least one pump whose characteristic curve, representing the relationship between lifting pressure p and stroke volume $V_H$, has a hyperbolic part which is determined by a torque controller on the pump.

Hydrostatic converters are known in which either the pump or at least one hydromotor having a displacer or the pump and the hydromotor are controllable. Depending on the type of control chosen, one speaks of a pure pump control, a pure motor control or of a combined control (VDI Report No. 131, Hydraulic Propulsion Technology, Düsseldorf, 1969, page 56).

The invention is concerned with converters of the first mentioned type, i.e. with converters that are equipped with a pump-control system. Compared to the other types of construction mentioned, such converters offer the constructive advantage that the adjustment and control of the converter, in the case of remote drives, can take place at a more advantageous site than in cases in which there is also a motor-control system. For converters with a pump-control system, it may be advantageous to equip the pump with a torque controller, that keeps the product of the stroke volume $V_H$ of the pump and the pump pressure p constant, once a certain pump pressure has been exceeded. Such torque controllers are also known (German Offenlegungsschrift 1,653,365). For a converter equipped with such a torque controller, the maximum torque of the pump is limited by an auxiliary force, which is generally produced by a spring, whose pre-tension can be adjusted to different values. The adjustment is made only once to correspond to the maximum torque permissible for the particular use.

On putting a drive unit, equipped with a converter of the indicated type, into service, the driving engine is first switched on. On so doing, the pump takes on its null position. When the driving engine has reached its rated rate of revolution, the regulating unit for the pump (i.e. the regulating unit for adjusting the stroke volume $V_H$ of the pump) is activated and changed. The pressure p can take on different values corresponding to the external loads on the hydromotor. The dependence of the torque of the pump on the product of the stroke volume $V_H$ and the pressure p can lead to torque fluctuations which can have an effect on the running of the driving engine. Once the product of stroke volume $V_H$ and pressure p reaches a certain value, further increases in pressure automatically lead to a reduction in the stroke volume because of the action of the torque controller, and consequently to maintaining a constant, maximum torque. This maximum torque $M_P$ corresponds to a maximum performance $P_P$ of magnitude $P_P = V_{HP} \times p \times n_p$. This performance is transferred to the hydromotor, i.e. the performance of the hydromotor, $P_M = V_{HM} \times p \times n_M$ is equal to $P_P$. If a constant displacement motor is used as hydromotor, i.e. a motor with constant absorptive volume $V_{HM}$, then this means that a relationship exists between the pressure $p_M$ of the hydromotor, which is proportional to the torque $M_M$, and the rate of revolution $n_M$ of the hydromotor. This relationship is characterized by a curve that also has a hyperbolic part. In the case that this characteristic curve corresponds to the maximum pump performance, that is to the pump performance whose level is determined by the maximum auxiliary force of the torque controller, difficulties result in the partial load range when, for example, the driving engine must drive other loads as well as the hydrostatic converter, as is customary, for example, in harvester threshers, fork lifts, wheel compressers, etc. These difficulties have their cause therein that, when raising the torque to be applied by the hydromotor while maintaining the rate of revolution of the driving engine, a higher output is withdrawn which reduces the portion of the output required for driving the remaining loads. This phenomenon is exceptionally undesirable. In the known solutions, it can only be avoided in the full-load region, since only under those conditions is there an automatic reduction in the rate of revolution of the hydromotor with increasing torque.

A further disadvantage of the known converters consists therein that, again when operating in the partial load region, they cannot be combined with mechanical change-under-load transmissions, which are used for enlarging the range of the converter. The reason for this is that, when for example changing the gear ratio of the change-under-load transmission from 1:1 to 2:1, twice as high a torque $M_M$ is demanded from the hydromotor for the same rate of revolution, because the output to be mustered remains the same. The converter can deliver this torque, provided it does not exceed the torque curve for the full-load range. The consequence however is a jerky acceleration of the driven load.

It is an object of the invention to eliminate the indicated deficiencies of the known hydrostatic converters and to provide a converter in which automatic, stepless adjustment of the rate of revolution and of the torque takes place at the hydromotor as a function of the load on the hydromotor, not only in the full load range, but also in the partial load range.

This object is accomplished in accordance with the invention thereby that the torque controller is provided with a device for producing a variable auxiliary force, whose magnitude can be adjusted with the help of the regulating unit for the pump for the purpose of displacing the hyperbolic portion of the characteristic curve in the performance graph of the hydromotor.

The inventive converter offers the advantage that, when used in installations in which one driving engine drives several users, changes in the load exerted on one user connected in series with the converter do not impair the behavior of the other users. Moreover, it is possible to combine the new converter with change-under-load transmissions. Finally, a gentle start is possible when using the inventive converter in vehicles. The inventive converter combines in itself the advantageous properties of hydrostatic converters with the advantageous properties of hydraulic converters, without having their disadvantages.

The invention is explained in greater detail in the following by means of the attached drawing.

Figure 1:
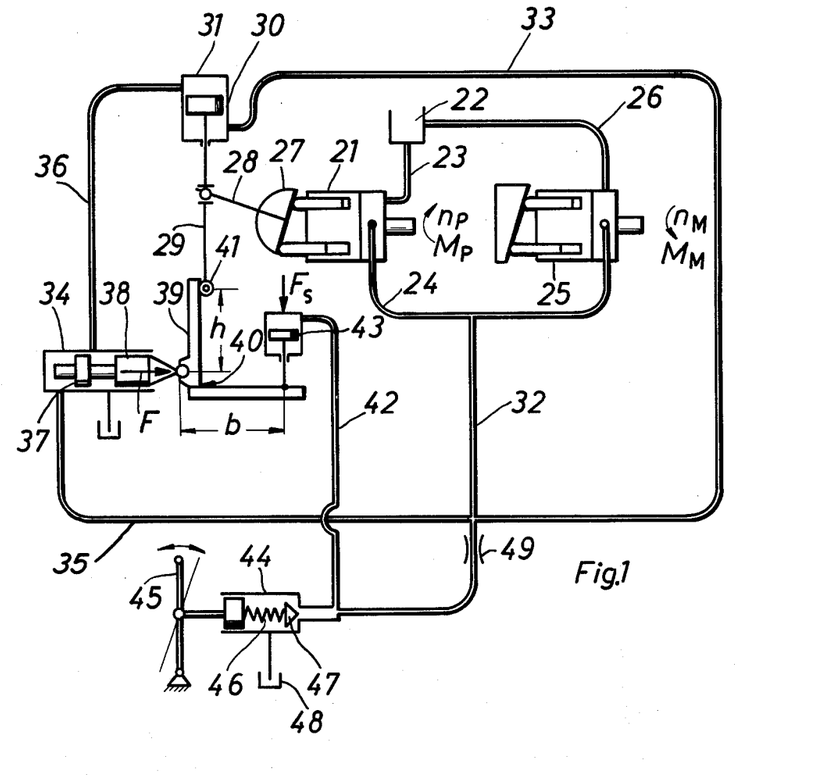
FIG. 1 is a diagrammatic representation of a first converter.

The converter according to FIG. 1 consists of a pump 21 with an adjustable stroke volume $V_H$. This pump runs at a rate of revolution $n_P$ and draws in a pressure medium from a reservoir 22 via a line 23. From pump 21, the pressure medium passes via line 24 to a hydromotor 25, whose volumetric delivery $V_M$ is constant. The hydromotor rotates at a rate $n_M$ in proportion to the amount of pressure medium conveyed to it. The pressure medium, with load relieved, returns to the reservoir 22 via a return line 26.

The stroke volume $V_H$ of pump 21 depends on the inclination of an inclined disk 27. This inclined disk 27 is connected via a swivel arm 28 with the piston rod 29 of an adjusting plunger 30, which is accommodated in an adjusting cylinder 31. The lower portion of the adjusting cylinder is constantly acted upon by the pressure medium, which is under operating pressure, via lines 32 and 33. A control valve 34 is used for displacing the adjusting plunger. This control valve is connected on the one hand via line 35 with line 32 and, on the other hand, via line 36 with the upper portion of the adjusting cylinder 31. The face 37 of the control piston 38 of the control valve is acted upon by the operating pressure. By this construction the control piston 38 exerts a force F on the arm 39 of a toggle lever 40, that is equal to the product of the operating pressure p and the area $f_K$ of the control piston 38.

$$F = p \times f_K \quad (1)$$

The force F produces a torque about a track-supporting roller 41 carried by the piston rod 29. The magnitude of the torque is equal to the product of F × h. The torque F × h is counteracted by a torque $F_S$ × b, where b is a constant distance and $F_S$ a hydraulically produced auxiliary force. The auxiliary force $F_S$ is determined by the pressure that exists in line 42 and acts on a piston 43. The torques mentioned are in equilibrium in the resting position of the controller.

$$F \times h = F_S \times b \quad (2)$$

or $$p \times f_K \times h = F_S \times b \quad (3)$$

Since h is proportional to the stroke volume of pump 21 and $f_K$ and b are constant quantities, the following equation also applies:

$$\text{constant} \times p \times V_H = F_S \quad (4)$$

As is well known, $p \times V_H$ is proportional to the driving moment of pump 21. The following is therefore obtained:

$$\text{constant} \times M_P = F_S \quad (5)$$

If $F_S$ is now varied steplessly, the driving moment $M_P$ of the pump changes. This change in $F_S$ is carried out by means of control valve 44. The set point of force $F_S$ is set with a hand lever, which forms the regulating unit 45 of pump 21. A spring 46 is tensioned by the regulating unit 45 and exerts a pressure on a cone 47. In addition, the cone is acted upon by the operating pressure in line 42. Depending on the operating pressure in line 42, cone 47 frees an opening to tank 48 and a pressure drop results in line 42 because of the throttle valve 49. The torque $M_P$ of the pump can therefore be pre-set as the set point in the manner described.

Figure 2:
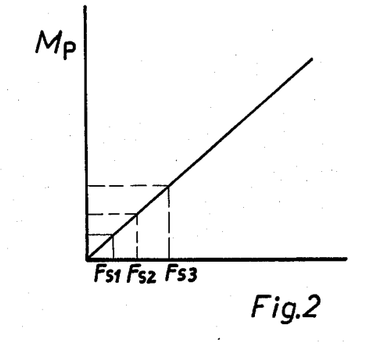
FIG. 2 shows the torque of the pump of the converter according to FIG. 1.

The behavior of pump 21 is shown as the characteristic curve in FIG. 2. Corresponding to the settings of the regulating unit 45, different forces $F_S$ are produced to which different torques $M_P$ are assigned.

Figure 3:
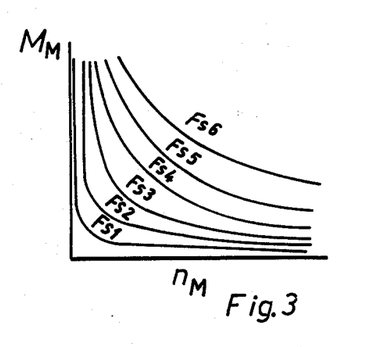
FIG. 3 shows the torque of the hydromotor of the converter according to FIG. 1, as a function of the rate of revolution of the hydromotor and the respectively set auxiliary force of the torque controller.

FIG. 3 shows the characteristic curve of the hydromotor 25. For a constant rate of revolution of the pump $n_p$, the torque $M_M$ of the hydromotor and the rate of revolution of the motor $n_M$ are proportional to the force $F_S$.

$$F_S = f(M_M \times n_M) \quad (5)$$

As a consequence, a family of hyperbolas, displaced in the abscissa direction depending on the setting of the regulating unit 45, is obtained in the motor diagram. The behavior of the hydrostatic converter resulting therefrom is regarded as ideal for the drive of, for example, vehicles, winches, forging machines, presses, etc. It is comparable with the behavior of a steam engine with adjustable charge (see Verein Deutscher Ingenieure (Association of German Engineers) Report 228, 1975, page 7).

In considering, for example, the drive of a vehicle, it is desirable to have the full torque available at the moment of starting. This is achieved by starting with a small force $F_{S1}$. Depending on the desired acceleration of the vehicle, force $F_S$ is increased, for example, to a value of $F_{S6}$. $F_{S6}$ can correspond to the maximum permissible torque of the driving engine and be limited. The driving speed is proportional to the rate of revolution $n_M$ and is adjusted automatically corresponding to the setting of $F_S$ and the external load $M_M$.

Figure 4:
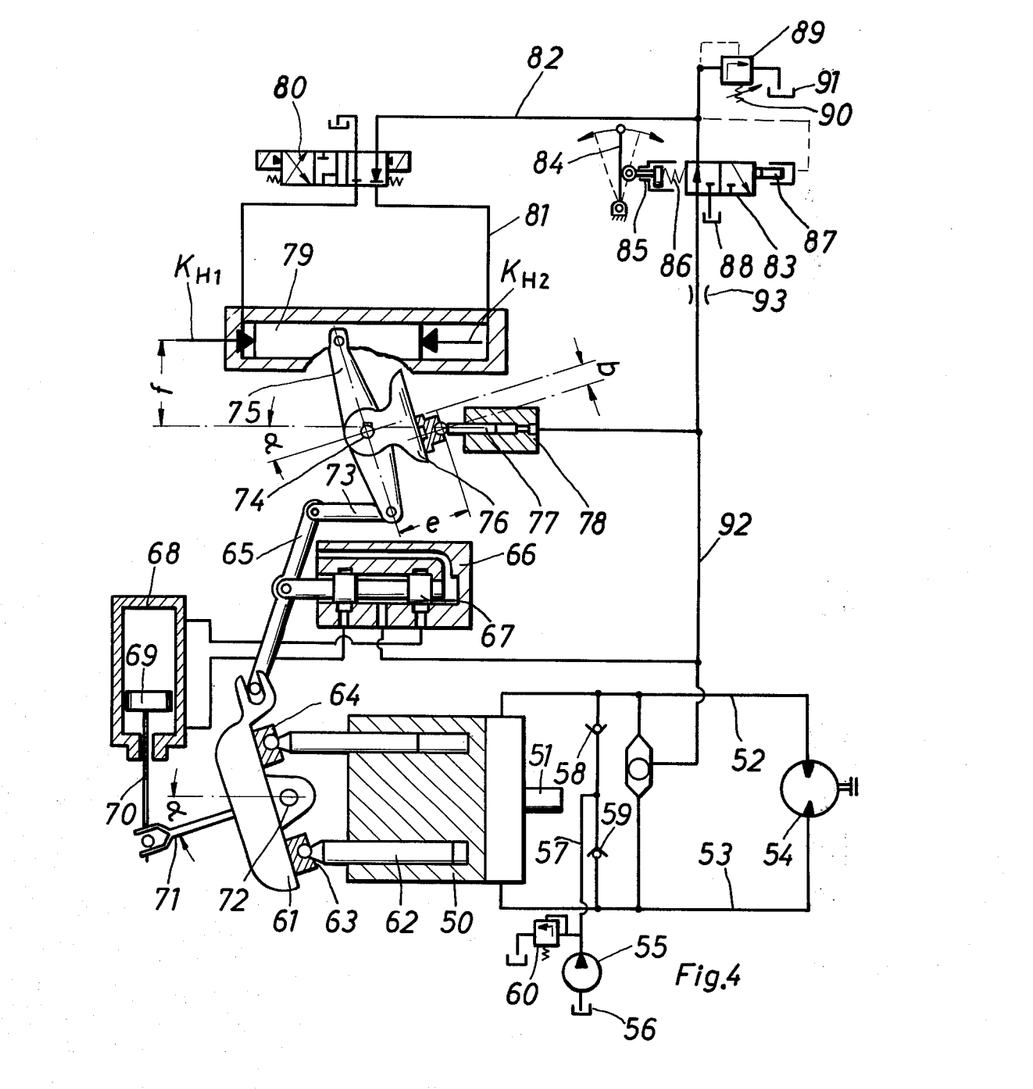
FIG. 4 shows a modified version version of a converter.

FIG. 4 shows a hydrostatic converter with a so-called "closed circuit". This converter is controlled in that the torque is adjusted steplessly at the coupling of the hydropump, corresponding to the power transfer desired at that time. If the drive rate of revolution of the hydropump is constant, one can also speak of a control of the transmission power. In this case also, not only is the stroke volume of the pump controlled as in the known converter, but the product of stroke volume and operating pressure are also controlled. The hydromotor can operate in both operating directions by reversing the hydropump. The second converter is in addition supplied with a device by which the highest pump torque to be received is limited to a fixed value.

The second modification has a pump 50, whose shaft 51 is driven by a driving engine that is not shown. Pump 51 is connected with a hydromotor 54 via lines 52 and 53. Either line 52 or 53 is the high pressure line, depending on the preselected direction of rotation of the hydromotor 54. In order to fill the system, the pressure medium is fed with an auxiliary pump 55 from a tank 56 by a line 57 and non-return valves 58, 59 into the respective low-pressure lines 52 or 53. The filling pressure is limited by a pressure valve 60.

By tilting the inclined disk of pump 50 about the angle α, the displacement of piston 62, which rests via ball end 63 and sliding block 64 on the inclined disk 61, can be altered. The stroke volume is adjusted by the lever 65. For increasing the displacement forces, a hydraulic amplifier is used that consists of a control valve 66 having a servo valve spool 67 and an operating cylinder 68 coupled hydraulically with the control valve. A piston 69 of the operating cylinder acts via its piston rod 70 on an arm 71 of the inclined disk 61 and tilts this about a stud 72.

A control device, on which either force $K_{H1}$ or $K_{H2}$ is exerted, acts on lever 65 via a coupling rod 73. These forces are proportional to the operating pressure and to the stroke volume.

$$K_{H1} \text{ or } K_{H2} = f(p \times V_H) \tag{7}$$

The condition, resulting in equation 7, is fulfilled if the control device consists of a lever 75 that can tilt about an axis 74. An adapter 76 is connected with the lever 75. A force acts at a distance b on this adapter. The force is proportional to the product of the piston surface $f_K$ and the operating pressure p existing in a cylinder 78 holding the piston. A torque is thereby produced about the axis 74, whose magnitude is given by the following equation:

$$M = (f_K \times p \times b)/\cos \alpha \tag{8}$$

In this equation $$b = e \times \sin \alpha \tag{9}$$

Since e and $f_K$ are constant $$M = \text{constant}_1 \times p \times \tan \alpha \tag{10}$$

Since tan α is proportional to the stroke volume of pump 50, one can also write $$M = \text{constant}_2 \times p \times V_H \tag{11}$$

This torque is counteracted by a torque $K_{H1}$ or $K_{H2} \times$ f, whereby f is again a constant. It therefore follows that $$K_{H1} \text{ or } K_{H2} = \text{constant} \times p \times V_H \tag{12}$$

The forces $K_{H1}$ or $H_{H2}$, which act on piston 79, are therefore proportional to the product of stroke volume and pressure of pump 50.

If, for example, torque $f_K \times p \times b \times \tan \alpha$ exceeds torque $K_H \times$ f, lever 75 swings back with reduction of the angle until the two torques are again in equilibrium. The movement of lever 75 is transferred to the inclined disk 75 of the pump via the servo system.

In order to control the pump, the direction of tilt of piston 77 and therefore of pump 50 is preselected with the help of valve 80. In the example shown, pressure acts on the piston via line 81. Line 81 is connected with line 82 via the valve 80. A pressure medium reaches this line 82 via a valve 83.

The height of the pressure, that acts in line 81 and 82, is controlled by valve 83, which is constructed as a pressure reducing valve. The set point of the pressure is pre-set by a regulating unit 84 that acts on a tappet 85 and a spring 86. The spring force is compared with the compressive force which acts on the slide of valve 83 via a piston 87. If the compressive force, exerted by piston 87, exceeds the force of spring 86, then valve 83 opens to a tank 88. As a result, there is a pressure drop in line 82.

When starting off the converter, the force of spring 86 is set to the value zero. Therefore $K_{H2}$ is also equal to zero, i.e.

$$0 = \text{constant} \times p \times V_H \tag{13}$$

In other words, the pump has its zero delivery position.

$K_{H2}$ is subsequently increased by slowly tensioning spring 86. The result is that a certain rate of revolution $n_M$, corresponding to the external load $M_M$ sets in at the hydromotor 54.

$$K_{H2} = \text{constant}_4 \times M_P \times n_P = \text{constant} \times pV_H \times n_p = \text{constant}_3 \times M_M \times n_M \tag{24}$$

In order to prevent its being exceeded, the pump torque $M_p$ can be limited in a simple manner. In the example shown, a pressure-limiting valve 89 is connected to line 82. The height of the pressure in line 82, and consequently the value of $K_{H2}$ or $K_{H1}$ can be limited by means of spring 90. If for example the pressure is exceeded, valve 89 opens to tank 91. A pressure drop takes place in line 82 via the throttle valve 93 mounted in line 92 and the inclined disk 61 of the pump 50 tilts back to the initial position until the pressure limiting valve 89 closes again.

The adjustment of $F_S$ or $K_H$ can be automated such that the operator controls only the engine. In such a case, it is, for example, meaningful to create a connection between the rate of revolution of a diesel motor and the magnitude of the auxiliary force. By such means, it is possible to attain a condition in which the torque, measurable from the pump of the converter, rises simultaneously with the increasing rate of revolution of the driving engine.

Figure 5:
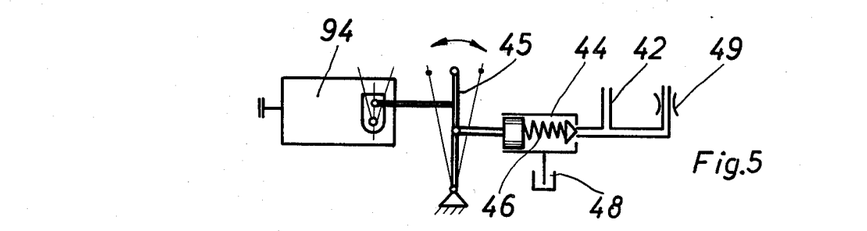
FIG. 5 shows one possibility for controlling the adjustment for a converter according to FIGS. 1 and 4 by means of an injection pump.

FIG. 5 shows how the regulating unit 45, for adjusting the auxiliary force $F_S$, is connected with an injection pump 94 of a diesel motor.

Figure 6:
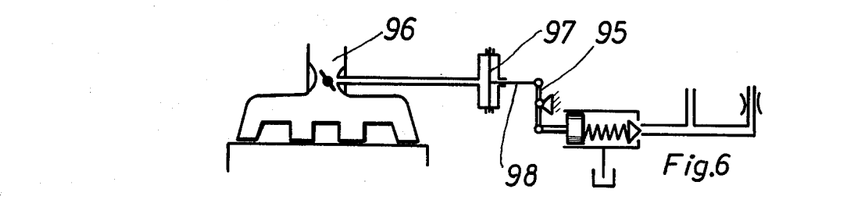
FIG. 6 shows the control of an adjustment element of a converter according to FIG. 1 and FIG. 4, with the aid of the vacuum existing in the manifold of an internal combustion engine.

FIG. 6 shows a solution in which a regulating unit 95 is controlled by a vacuum in the induction manifold 96 of an internal combustion engine by a membrane 97 which is connected via a rod 98 with the regulating unit 95.

Figure 7:
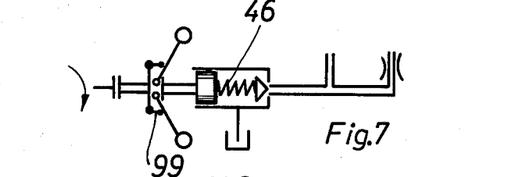
FIG. 7 shows the control of the adjusting element of a converter according to FIG. 1 or 4 with the aid of a centrifugal governor.

FIG. 7 shows a variation in which the pressure of spring 46 is controlled by a centrifugal governor 99 of a driving engine as a function of the rate of revolution of the engine.

Figure 8:
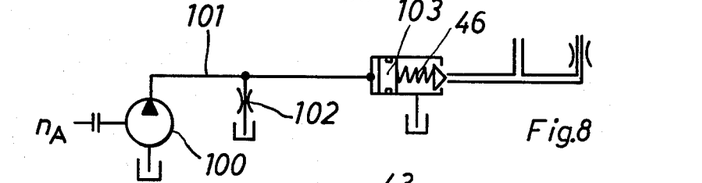
FIG. 8 shows the control of a converter according to FIG. 1 or FIG. 4 by means of an auxiliary pump.

FIG. 8 shows how a relationship between the rate of revolution $n_A$ of a driving engine and the auxiliary force $F_S$ can be produced by means of an auxiliary pump 100. The auxiliary pump 100 supplies, in proportion to the rate of revolution $n_A$, a pressure medium into line 101 to which a constant throttle valve 102 is connected. The pressure in line 101 is approximately $$p = \text{constant} \times n_A^2 \qquad (15)$$

This pressure p exerts a force via piston 103 onto spring 46 which determines the auxiliary force $F_S$. $F_S$ then is $$F_S = \text{constant} \times n_A^2 \qquad (16)$$

Figure 9:
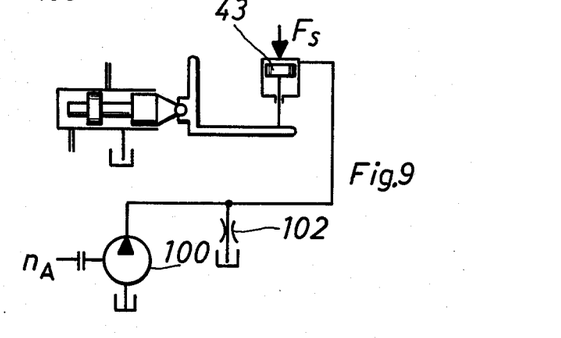
FIG. 9 shows the control of a converter according to FIG. 1 or FIG. 4 with an auxiliary pump which directly influences the auxiliary force.

The pressure p of the auxiliary pump can also act directly on piston 43 as shown in FIG. 9.

Hydrostatic converters are frequently equipped with additional control possibilities for enlarging the converter range. The control possibilities can be realized by mechanical gears or also by hydraulic means in that, for example, the absorptive volume of the hydromotor is constructed so that it can be reversed or that possibilities are provided for connecting or disconnecting several hydromotors. In so doing, it is frequently a requirement that the connection of mechanical "step-up" or "step-down" conversion stages takes place without interruption to the tractive power, that is, that a change-under-load is possible. A further requirement is that the switching process should take place as smoothly as possible. The described converters fulfil these requirements in exemplary fashion.

Figures 10, 11:
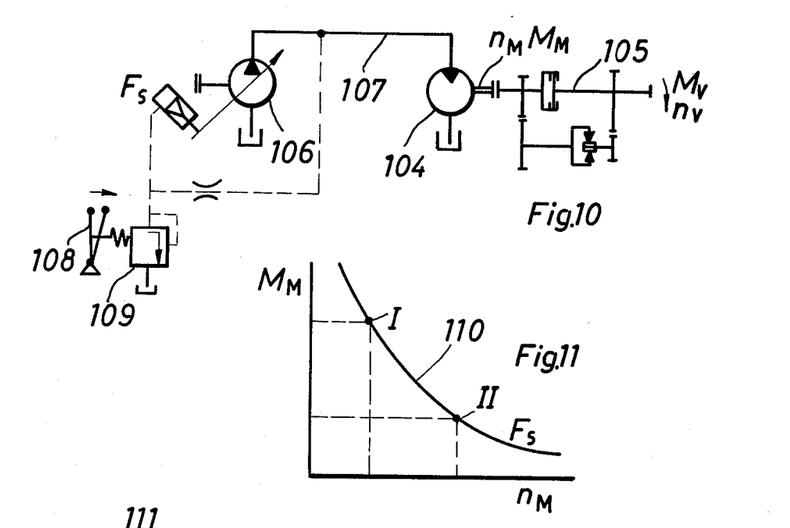
FIG. 10 shows a converter to which a change-under-load transmission is connected in series.
FIG. 11 shows the characteristic curve of the hydromotor of the device according to FIG. 10.

FIG. 10 shows a simplified representation of a hydrostatic converter with a hydromotor 104, to which a mechanical change-under-load transmission is connected in series. Pump 106 is driven by an engine at a rate of revolution $n_P$. It delivers hydraulic oil via line 107 to the hydromotor 104, that rotates at a rate $n_M$. Adjustment takes place via a regulating unit 108, that controls a control valve 109 and determines the magnitude of the auxiliary force $F_S$. The auxiliary force $F_S$ is proportional to the drive torque $M_p$ of pump 106.

FIG. 11 shows the behavior of the hydromotor 104 during a switching process. The characteristic curve 110 of the hydromotor 104 is pre-set for a given value of the auxiliary force $F_S$. Corresponding to the original load, the motor shall run on the characteristic curve 110 at point I with drive torque $M_{MI}$ and motor speed $n_{MI}$. Since the power flow in the converter, corresponding to the setting of $F_S$, is the same at all points if losses are ignored.

$$M_P \times n_P = M_{MI} \times n_{MI} = M_V \times n_V \qquad (17)$$

$n_P$ being constant and $M_p$ prescribed according to the setting of $F_S$. If for example a transmission step with twice the gear ratio is now engaged, the pressure in line 107 reduces immediately to one half of its original value. This has the effect that the pump adjusts itself immediately to twice the stroke volume $V_H$, since $$F_S = \text{constant} \times p \times V_M = \text{constant} \qquad (18)$$

or $$M_P \times n_P = (M_{MI}/2) \times 2 \times n_{MI} = M_{MII} \times n_{MII} \qquad (19)$$

Since the primary shaft of the mechanical gear now turns at twice the rate of rotation it had been turning at prior to the engagement of the new gear ratio, but is reduced to a slower rate by twice the amount, $M_V$ and $n_V$ of the respective user remain unchanged. The step jump was fully compensated for by the pump and the change-over was carried out without jolting. The hydromotor now runs on the characteristic curve at point II.

It is immaterial whether the steps are constructed as mechanical transmissions or as a reversible absorptive volume of the hydromotor 104 or whether an additional hydromotor is connected. In each case, the control pump compensates for the change-over jolt and automatically adjusts itself to the new operating state.

Figure 12:
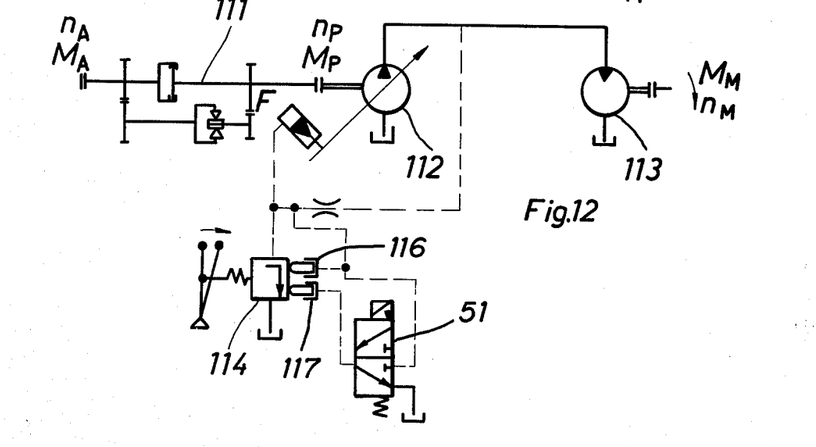
FIG. 12 shows a converter connected in series with a change-under load transmission.
Figure 13:
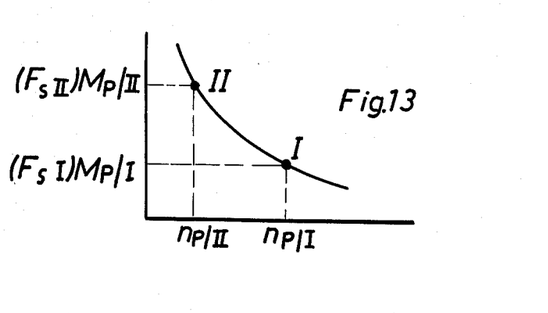
FIG. 13 shows a characteristic curve of the converter according to FIG. 12.

A modified version of a hydrostatic converter with mechanical switching step is shown in FIG. 12. A change-under-load transmission 111 is arranged here before the drive of pump 112. If the converter runs, for example, on the characteristic line of FIG. 13 at point I and if the change-under-load transmission 111 is switched over to a more rapid rate in the ratio of 1:2, pump 112 runs at twice the rate of revolution at point II in FIG. 13. In order that the same power is transmitted, the drive torque $M_P$ must go back to half the value or the stroke volume of the pump must reduce to a half. Only then does the hydromotor 113 run with a constant rate of revolution $n_M$ and a constant torque $M_M$ in spite of the change-over process. This objective is achieved in that the controlling force $F_S$, which is proportional to the drive torque, is lowered to half the value. This is achieved either by reducing the set value of the spring force of the pressure-regulating valve 114 by a factor of 2 or by doubling the actual value of the force of valve 114. In the example shown, this takes place by hydraulically connecting piston 116 via a controllable valve 51 with a piston 117 of the same piston surface.

I claim:

1. Hydrostatic converter, infinitely adjustable by an adjusting organ with at least one hydromotor and at least one pump, the characteristic curve of the interrelation of discharge pressure p and piston displacement $V_H$ of said pump having a hyperbolic portion which is determined by a torque regulator on said pump, the performance graph of said hydromotor showing the interrelation between driving torque $M_M$ and motor speed $n_M$ having a hyperbolic portion, characterized in that said torque regulator is provided with a regulating unit for producing a variable auxiliary power, the size of said power which, for the purpose of moving said hyperbolic portion of said performance graph of said hydromotor (25, 54, 104, 113) with the aid of said regulating unit (45, 84, 95, 108) for said pump (21, 50, 106, 112), is adjustable.

2. Hydrostatic converter according to claim 1, characterized in that its regulating unit (45) is coupled to an operating lever of a driving machine for the converter.

3. Hydrostatic converter according to claim 1, characterized in that its regulating unit (95) is controlled by underpressure in a manifold tube (96) of an internal combustion engine for the driving of the converter.

4. Hydrostatic converter according to claim 1, characterized in that its regulating unit is formed by a centrifugal governor (99) of a driving machine for the converter.

5. Hydrostatic converter according to claim 1, characterized in that its regulating unit is formed by an auxiliary pump (100) which is driven by a driving machine for the converter.

6. Hydrostatic converter according to claim 5, characterized in that a constant pressure regulating valve (102) is placed on the pressure side of the auxiliary pump (100).

7. Hydrostatic converter according to claim 1, characterized in that at least one mechanical circuit interrupter (105) is connected after the converter (106, 104).

8. Hydrostatic converter according to claim 1, characterized in that at least one mechanical circuit interrupter is connected before the converter (112, 113).

9. Hydrostatic converter according to claim 1, characterized in that the volume of absorption of the hydromotor is switchable.

10. Hydrostatic converter according to claim 1, characterized in that it has several hydrostatic loads that can be switched on and off stepwise.

11. Hydrostatic converter according to claim 10, characterized in that the hydrostatic loads are switchable in series.

12. Hydrostatic converter according to claim 2, characterized in that at least one mechanical circuit interrupter (105) is connected after the converter (106, 104).

13. Hydrostatic converter according to claim 2, characterized in that at least one mechanical circuit interrupter (111) is connected before the converter (112, 113).

14. Hydrostatic converter according to claim 2, characterized in that the volume of absorption of the hydromotor is switchable.

15. Hydrostatic converter according to claim 2, characterized in that it has several hydrostatic loads that can be switched on and off step-wise.

16. Hydrostatic converter according to claim 3, characterized in that at least one mechanical circuit interrupter (105) is connected after the converter (106, 104).

17. Hydrostatic converter according to claim 3, characterized in that at least one mechanical circuit interrupter (111) is connected before the converter (112, 113).

18. Hydrostatic converter according to claim 3, characterized in that the volume of absorption of the hydromotor is switchable.

19. Hydrostatic converter according to claim 3, characterized in that it has several hydrostatic loads that can be switched on and off step-wise.

* * * * *

UNITED STATES PATENT OFFICE
CERTIFICATE OF CORRECTION

Patent No. 4,132,072          Dated January 2, 1979

Inventor(s) Gunter R. Schlinke

It is certified that error appears in the above-identified patent and that said Letters Patent are hereby corrected as shown below:

Title Page, Below "Foreign Application Priority Data": Delete "Apr. 26, 1977" and in lieu thereof insert -- May 7, 1976 --.

Column 2, Line 67: Delete "version" (second occurrence).

Column 5, Line 6: Delete "51" and in lieu thereof insert "50".

Column 5, Line 38: After "piston" insert -- 77 --.

Column 5, last line: Delete "75" and in lieu thereof insert -- 61 --.

Column 6, Line 2: Delete "77" and in lieu thereof insert -- 79 --.

Column 8, Line 43: (Claim 1, Line 11): After "power" insert -- ($F_S$) --.

Signed and Sealed this

Seventeenth Day of April 1979

[SEAL]

Attest:

RUTH C. MASON
Attesting Officer

DONALD W. BANNER
Commissioner of Patents and Trademarks